Patented May 29, 1923.

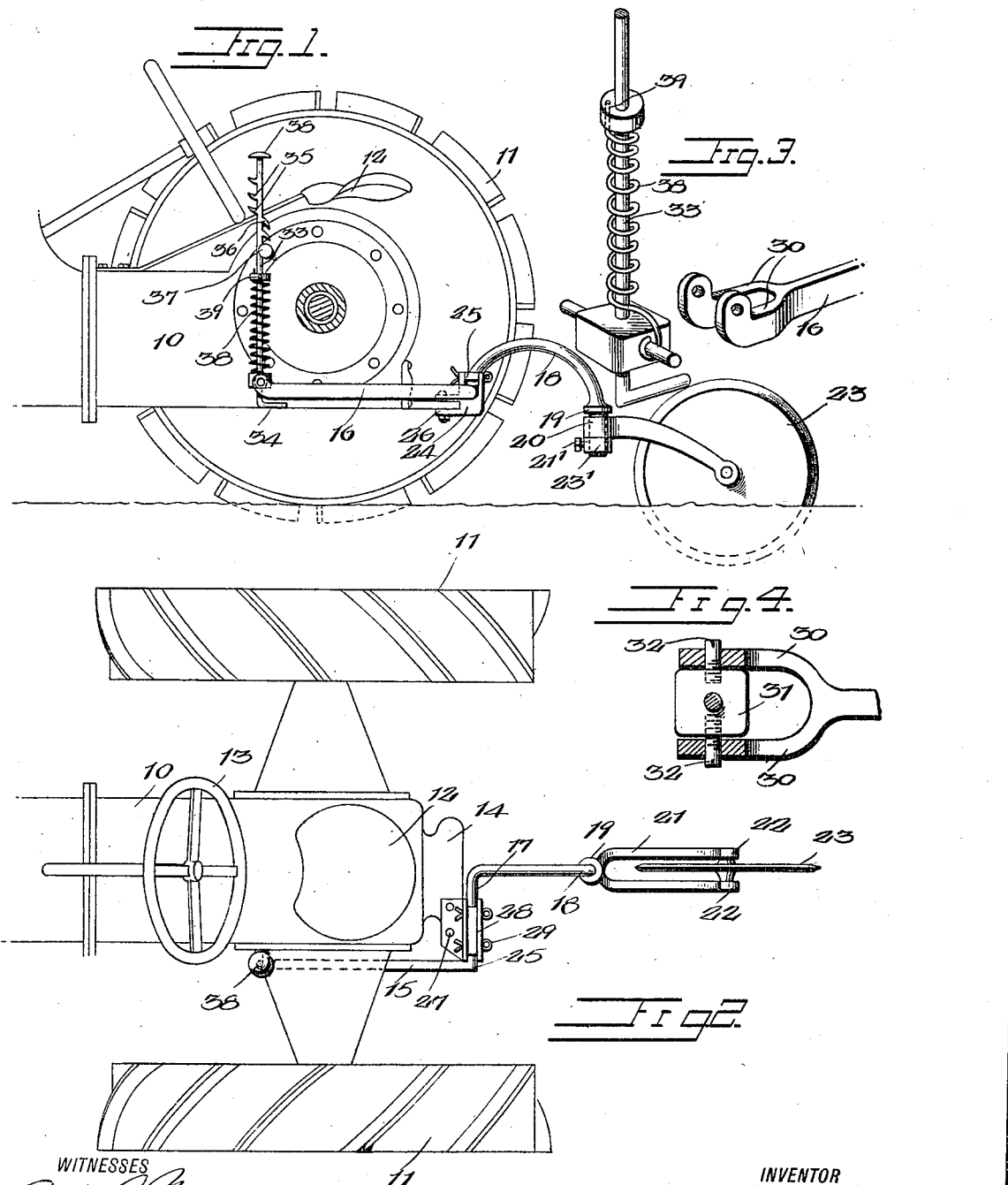

1,456,819

UNITED STATES PATENT OFFICE.

BENJAMIN W. MORTON, OF WILLISTON, FLORIDA.

COLTER ATTACHMENT FOR TRACTORS.

Application filed December 4, 1922. Serial No. 604,949.

*To all whom it may concern:*

Be it known that I, BENJAMIN W. MORTON, a citizen of the United States, and a resident of Williston, in the county of Levy and State of Florida, have invented certain new and useful Improvements in Colter Attachments for Tractors, of which the following is a specification.

This invention relates to colter attachments for tractors or the like.

The invention more particularly relates to the manner of attaching a colter to a tractor; and has for its purpose to provide means of this character whereby a colter may be subjected to a yieldable pressure for causing the same to penetrate the soil over which it may operate.

It is also an important object of the invention that means be provided whereby the colter may be rigidly held against upward movement and thus establish a certain depth at which the colter must penetrate the soil over which the same operates.

It is also an object of the invention that the attachment means for the colter be adjustable and adapted to serve for lifting the colter from the earth when it is desired to render the same inoperative.

Other objects, and objects relating to details of construction, combination and arrangement of parts will hereinafter appear in the detailed description to follow.

The invention is illustrated by way of example in the accompanying drawings, in which:—

Figure 1 is a vertical sectional view taken longitudinally and adjacent one side of the rear end portion of a tractor and illustrating the application of the present invention.

Figure 2 is a top plan view of a rear end portion of the tractor and showing the application of the invention, the same as in Figure 1.

Figure 3 is a group view illustrating the operating means used in the present invention for adjusting the pressure upon the colter.

Figure 4 is a detail horizontal sectional view illustrating the manner in which the fulcrum bar for the colter is connected to the control spring shown in Figure 3.

Referring to the drawings more particularly, 10 indicates the rear end portion of the body of a tractor and 11 the drive wheels of said tractor. The usual seat for the operator of the tractor is indicated at 12. At 13 is shown the steering wheel of the tractor and at 14 the draw bar connector or coupling member for said tractor.

In carrying out the present invention there is provided what may be termed a "fulcrumed bar" and which is generally designated by the reference character 15. This fulcrum bar consists in a forward end portion 16 which terminates at its rear end in a lateral extending portion 17 and said lateral extending portion in turn terminating in a rearwardly extending portion 18. The rearwardly extending portion 18 is arcuate in shape and is formed adjacent its free end with an enlargement 19. The end portion of this bar forward to the enlargement 19 is adapted for receiving an eye 20 of the V-shaped member or cradle 21. The member 21 has each of its leg portions provided with an eye 22 and said eye being adapted to journal the studs carried by a disk member or colter 23. The eye 20 is held against removal from the fulcrum bar by a collar 23', said collar in turn being removably held by a set screw 21'.

For connecting the fulcrum bar 15 to the tractor there is provided an L-shaped casting or block 24 having each of its ends provided with a recess as at 25 and 26 respectively. The recess 26 is adapted to receive the free end portion of the coupling member 14 and is rigidly secured thereto by the means of bolts 27, while the recess 25 is adapted to receive the laterally extending portion 17 of the fulcrum bar 15. A block 28 is fitted in the recess 25 so that the same is disposed upon the lateral extending portion 17 of the fulcrum bar 15 and this block is removably held by the cotter pins 29. The portion 17 of the fulcrum bar is free to turn within the recess 25.

The free or forward end of the fulcrum bar portion 16 terminates in a pair of prongs 30 between which there is turnably supported a block 31. The block 31 carries a pair of studs 32, each stud being journaled in a suitable opening in the associated prong 30 and thereby to efficiently pivot the block 31. One of the studs 32 may be made removable, that is, threaded into the block 31 whereby to make it possible for easily positioning these studs in assembling the present apparatus.

The block 31 is provided with a suitable bore through which a rod 33 may freely slide. This rod carries at its lower end a lateral extending projection 34 and adjacent its upper end is formed with a plurality of upwardly curved teeth 35. Immediately below the teeth 35 the rod is formed with a plurality of downwardly curved teeth 36, said teeth being preferably located upon the rod with relation to the teeth 35 as best illustrated in the drawings. The casing or housing of the tractor is provided with a stud 37 which extends laterally therefrom and with which either the teeth 35 or teeth 36 of the rod 33 may be brought to engage.

A compression spring 38 is provided which encircles the rod 33 and which is rigidly connected at its upper end as at 39 to the rod 33. At the lower end of this spring the same is rigidly secured to one of the studs 32. The upper end of the rod may terminate in a knob 38 or other suitable means by which the same may be easily grasped for being operated.

In the use of the present invention, assuming it is desired to place a yieldable pressure upon the colter 23 then the rod 33 is so moved that one of its uppermost teeth 35 will engage with the stud 37 thereby pulling upon the forward end of the fulcrum bar 15 through the spring 38. This pulling action will serve to place a pressure upon the colter 23. In case the colter 23 should meet an obstruction then the forward end of the fulcrum bar 15 may swing downwardly against the tension of the spring 38 in order to permit the colter to pass over the obstruction. The pressure upon the colter may be regulated by manipulating the rod 33, that is, by holding the stud 37 to engage different teeth 35 of said rod and thereby placing the spring 38 to different tensions.

In case it is desired to rigidly hold the forward end of the fulcrum bar 15 against downward movement and thus to rigidly hold the colter 23 against upward movement, the rod 33 should be drawn upwardly so that one of its lowermost teeth 36 will engage the stud 37 thus bringing the lateral projection 34 of the rod 33 to engage beneath the forward end of the fulcrum bar 15 and so positively hold the forward end of this fulcrum bar against downward movement. Now should it be desired to lift the colter 23 and render the same inoperative, the rod 33 should be adjusted so that one of its teeth 35 will engage with the stud 37 and thus depress the spring 38 which in turn will depress the forward end of the fulcrum bar 15 and elevate the colter 23.

While I have shown and described the preferred form of my invention, I wish it to be understood that I am aware of the fact, that the construction, combination and arrangement of parts may be changed by those skilled in the art without departing from the spirit of the invention, as indicated by the appended claims.

I claim:

1. In combination, a tractor, a lever bar having an intermediate offset portion and a rear arcuate shaped portion, a colter pivotally connected to the rear end of said lever bar, means whereby the offset portion of said lever bar may be fulcrumed upon the rear end of a tractor, and means associated with the forward end of said lever bar whereby the upward and downward movements of said colter may be controlled.

2. In combination, a tractor, a lever bar having an intermediate offset portion and a rear arcuate shaped portion, a colter pivotally connected to the rear end of said lever bar, means whereby the offset portion of said lever bar may be fulcrumed upon the rear end of a tractor, and spring means associated with the forward end of said lever bar whereby said end will be yieldingly held against downward movement.

3. In combination, a tractor, a lever bar having an intermediate offset portion and a rear arcuate shaped portion, a colter pivotally connected to the rear end of said lever bar, means whereby the offset portion of said lever bar may be fulcrumed upon the rear end of a tractor, and spring means associated with the forward end of said lever bar whereby said end will be yieldingly held against downward movement, said means being also adapted to be adjusted for positively holding the forward end of said lever bar against downward movement.

4. In combination, a tractor, a block adapted to be connected rigidly to the draw bar coupling member of said tractor, a lever bar having an intermediate offset portion adapted to be pivotally supported for vertical swinging movement of the lever bar by said block, said lever bar having a rear end portion arcuate in shape, a colter pivoted to the last named portion of said lever bar for lateral swinging movement, and means associated with the forward end of said lever bar adapted to yieldably hold the same against downward movement for the purpose described.

5. In combination, a tractor, a block adapted to be connected rigidly to the draw bar coupling member of said tractor, a lever bar having an intermediate offset portion adapted to be pivotally supported for vertical swinging movement of the lever bar by said block, said lever bar having a rear end portion arcuate in shape, a colter pivoted to the last named portion of said lever bar for lateral swinging movement, and yielding and adjustable means associated with the forward end of said lever bar adapted to hold the same against downward movement for the purpose described.

6. In combination, a tractor, a bar fulcrumed upon the rear end of the tractor for swinging movement in a vertical plane arranged longitudinally of the tractor, a colter carried by the rear end of the bar, and means whereby the forward end of the bar may be locked against downward movement and thereby to impose the weight of the tractor upon the colter whereby to insure that the colter will penetrate the earth over which said tractor passes a predetermined degree.

7. In combination, a tractor, a bar fulcrumed upon the rear end of the tractor for swinging movement in a vertical plane arranged longitudinally of the tractor, a colter carried carried by the rear end of said bar, and means associated with the forward end of said bar whereby the same may be adjustably locked against downward movement and thereby to impose upon the colter the full weight of the tractor and thus insure that said colter will penetrate the earth over which said tractor passes a predetermined degree.

BENJAMIN W. MORTON.